United States Patent [19]

Maisotsenko et al.

[11] 4,350,570

[45] Sep. 21, 1982

[54] WATER DESALINATION METHOD

[76] Inventors: Valery S. Maisotsenko, ulitsa Sadovaya, 21, kv. 7; Alexandr B. Tsimerman, Chernomorskaya doroga, 19, kv. 7; Mikhail G. Zexer, ulitsa Varnenskaya, 2/2, kv. 91, all of Odessa, U.S.S.R.

[21] Appl. No.: 261,200
[22] PCT Filed: May 5, 1980
[86] PCT No.: PCT/SU80/00069
§ 371 Date: May 17, 1981
§ 102(e) Date: May 8, 1981
[87] PCT Pub. No.: WO81/00707
PCT Pub. Date: Mar. 19, 1981

[30] Foreign Application Priority Data

Sep. 17, 1979 [SU] U.S.S.R. ............... 2817564

[51] Int. Cl.³ ............................................. C02F 1/10
[52] U.S. Cl. ....................................... 203/10; 203/49; 203/86; 203/90; 202/176; 202/234; 202/185 B
[58] Field of Search .................. 203/49, 10, 11, 90, 203/86, 89, DIG. 17; 202/234, 176, 177, 185 B, 236; 159/16 R

[56] References Cited

U.S. PATENT DOCUMENTS

| | | | |
|---|---|---|---|
| 2,902,414 | 9/1959 | Schmerzler | 203/49 |
| 3,345,272 | 10/1967 | Collins | 203/49 |
| 3,522,151 | 7/1970 | Dismore | 203/49 |
| 3,822,192 | 7/1974 | Brown | 203/49 |
| 3,852,162 | 12/1974 | Light | 203/49 |
| 3,860,492 | 1/1975 | Lowi et al. | 203/49 |
| 4,194,950 | 3/1980 | Zalles | 203/49 |

*Primary Examiner*—Wilbur L. Bascomb, Jr.
*Attorney, Agent, or Firm*—Lilling & Greenspan

[57] ABSTRACT

A method of desalinating water resides in evaporating water from an aqueous salt solution upon contact of the latter with air, the water vapor being subsequently retrieved by condensing. The evaporation of water from the aqueous salt solution through contact thereof with the air is conducted by using two air flows, that is, primary and secondary flows. The primary air flow is supplied to a cooling zone, while the secondary air flow and the aqueous salt solution are delivered to an evaporation zone wherein the secondary flow is moistened by the water evaporating from the aqueous salt solution by virtue of the psychrometric temperature difference until the moisture content in the secondary air flow is increased, as compared with the initial moisture content therein, by from 3.5 to 116 g/kg. During the course of absorbing the moisture, the secondary air flow acts to cool the primary air flow passing through the cooling zone. The secondary air flow is obtained by withdrawing between 20 and 90 volume percent from the primary air flow after it has passed through the cooling zone. Condensation of the water vapor is effected by conveying the secondary air flow which has passed through the evaporation zone and the remaining 80 to 10 volume percent of the primary air flow which has passed through the cooling zone to a condensing zone.

4 Claims, 2 Drawing Figures

1

WATER DESALINATION METHOD

FIELD OF THE INVENTION

The present invention relates to the art of water treatment, and more particularly to methods of desalinating water, such as sea or saline continental water.

PRIOR ART

Known in the art is a method of desalinating water wherein water is evaporated from an aqueous salt solution when the latter is made to come into contact with air and subsequently retrieved from the thus moisened air by condensation (cf. V. N. Slesarenko "Sovremennye metody opresnenia morskikh i solenykh vod— Modern Techniques for Desalination of Sea and Saline Waters" published in 1973 by the Energia Publishers, Moscow, pp, 47-48).

However, in this known method, a large amount of costly high-calorie heat energy is required to conduct the process (around 600 kcal/kg under atmospheric pressure, which corresponds to approximately 695 watts per 1 kg of desalinated water).

SUMMARY OF THE INVENTION

The invention is directed toward a method of desalinating water involving the evaporation of water from an aqueous salt solution upon contact with air and subsequent recovery of the water vapor from the air by condensation, wherein it would be possible to change the conditions for evaporation and condensation to obviate the need for energy to carry out the water evaporating process.

This is attained in a method of desalinating water wherein the evaporation of water from the aqueous salt solution upon contact of the solution with the air is conducted by using primary and secondary air flows, the primary air flow being supplied to a cooling zone, while the secondary air flow and the aqueous salt solution are supplied to an evaporation zone wherein the secondary air flow is moistened by the water being evaporated from the aqueous salt solution by virtue of the psychrometric temperature difference until the moisture content in said secondary air flow is raised as compared with the initial moisture content by from 3.5 to 116 g/kg. Meanwhile the secondary air flow while being moistened, tends to cool the primary air flow passing through the cooling zone, said secondary air flow being obtained by withdrawing some 20 to 90 volume percent from the primary air flow which has passed through the cooling zone. The condensation of the water vapor is effected by conveying the secondary air flows which has passed through the evaporation zone and the remaining 80 to 10 volume percent of the primary air flow which has passed through the cooling zones to a condensing zone.

The process of vaporizing water from the aqueous salt solution by contacting the salt with air and condensing the water vapor as heretofore described, makes it possible to vaporize the water contained in the aqueous salt solution without an external energy source as is the case with the known method, but due to the psychrometric temperature difference. Also, by imparting moisture to the secondary air flow in the evaporation zone, the latent heat of evaporation is removed from the secondary air flow. Further, thanks to the heat transfer between the secondary air flow and the primary air flow, the latter and the former are cooled and heated in the cooling zone and the evaporation zone, respectively. Consequently, two interrelated processes necessary for water desalination are carried out, the processes being (1) imparting moisture to the secondary air flow by the water vapor, and (2) cooling the primary air flow; said processes are conducted without any external heat energy being supplied.

Since the secondary air flow is produced by withdrawing a portion (20 to 90% by volume) of the cooled primary air flow, it is possible to effectively reduce the temperature of the primary air flow subsequent to its passage through the cooling zone to that approaching the dew point. Therefore, the temperature of the primary air flow at the outlet from the cooling zone is always sufficiently low to guarantee condensation of water vapor from the secondary air flow which has passed the evaporation zone.

Having in view the foregoing, moistened air and cool dry air are obtained with no outside heat energy being supplied to facilitate the process. The heat transfer between these two air flows tends to cause the water vapor to condense, resulting in the production of desalinated water.

The method of the present invention produces desalina water without the use of outside heat energy, which makes the desalination process less complicated and less costly. A negligible amount of electric power is consumed for driving the air fan; similar consumption of power being typical for effecting the hereinbefore described known method. The method of the present invention makes it possible to desalinate both sea water and saline continental waters having various salt concentrations therein.

According to the foregoing, the secondary air flow is moistened through water being evaporated from the aqueous salt solution until the moisture content in said secondary flow, as compared with the initial moisture content, is increased by from 3.5 to 116 g/kg. An increase in the moisture content of the secondary air flow below 3.5 g/kg is possible only in the case where all (or nearly all) of the primary air flow, subsequent to its passage through the cooling zone, is withdrawn and directed to the evaporation zone as the secondary air flow. This is characterized by a lack or at least insufficiently of the exact portion of the primary air flow which must be conveyed for condensing subsequent to the passage of the entire primary flow through the cooling zone. This, in turn makes it impossible to obtain desalinated water by condensing the water vapor from the secondary air flow which has passed the evaporation zone. On the other hand, an increase in the moisture content of the secondary air flow by more than 116 g/kg is impossible, because in this case the initial temperature of the primary air flow must be in excess of 100° C., which is unattainable natural climatic conditions. Conversely, preheating the primary air flow to over 100° C. is inadvisable, since the aqueous salt solutions tend to boil at such temperatures, which calls for the application of other suitable known desalination methods.

According to the method of the invention, the secondary air flow is obtained by withdrawing from the primary air flow some 20 to 90 volume percent thereof after it has passed through the cooling zone. If less than 20 volume percent is withdrawn from the primary air flow for obtaining the secondary air flow, the temperature of the primary flow subsequent to its passage through the cooling zone will be reduced insufficiently, which in turn will not enable condensation of the water vapor contained in the secondary air flow by the portion of the primary flow supplied for condensation, because the temperature of the primary flow will be higher than the dew point of the moistened secondary flow. In the case of withdrawing more than 90 volume percent from the primary air flow for obtaining the secondary flow, the amount of cooled air conveyed for condensation as the remaining portion (less than 10% by volume) of the primary flow will not be sufficient, thereby resulting in less condensate, i.e. desalinated water, being produced.

In order to increase the efficiency of the water evaporation process, the primary air flow is preheated to a temperature within the range of between 40° to 100° C. prior to being supplied to the cooling zone. Therewith, the primary air flow that enters the cooling zone has a temperature essentially higher than that of the outside air. Therefore, due to heat transfer between the primary air flow passing through the cooling zone and the secondary air flow passing through the evaporation zone, the temperature of the secondary air flow at the outlet from the evaporation zone will approach the temperature of the heated primary flow entering the cooling zone. In other words, the secondary air flow will also be heated to a higher temperature in the evaporation zone. Because of the moisture that evaporates from the aqueous salt solution and is continuously imparted to the secondary air flow, a higher temperature of the secondary air flow will result. Thus, the secondary air flow will capture more water from the solution and have a much higher moisture content at the outlet of the evaporation zone. This in the end will lead to a higher yield of water in the course of water retrieval from the secondary air flow by condensation.

Heating the primary air flow prior to its delivery to the cooling zone to a temperature below 40° C. is inadvisable, since the outside atmospheric air generally approaches that temperature in the summer. Conversely, preheating the primary flow to a temperature upwards of 100° C. is technologically unjustified, because at such a temperature the aqueous salt solution tends to boil making it more expedient to employ conventional distillation techniques.

In order to improve the efficiency of condensing the water vapor contained in the secondary air flow, the heretofore described process is preferably conducted in conjunction with simultaneous refluxing the primary air flow by the aqueous salt solution in the course of condensation. This is accompanied by the water vaporizing in the aqueous salt solution being entrained by the primary air flow or to exactly the portion (80 to 10% by volume) of the primary air flow that is fed for condensation. The evaporation is accompanied by the expenditure of the latent heat of vaporization which is transferred or withdrawn from the secondary air flow during the course of condensation. Therefore, the condensation heat is extracted from the secondary air flow not only by virtue of heating the cooled primary air flow, but also additionally due to the latent heat of vaporization expended during vaporizing the water from the aqueous salt solution and imparting the vapor to the portion of the primary air flow which is then fed for condensation. All the foregoing affords to increase the yield of desalinated water or improve the efficiency of the condensation process.

Best Mode of Carrying out the Invention

The water desalination method according to the invention is preferably carried out in the following manner.

The primary air flow (outside air) is conveyed to the cooling zone wherein it is made to come into intimate contact with the dry heat transfer surface. As a result, the primary flow is cooled down to a temperature essentially below the wet-bulb temperature, the lowest cooling temperature approaching the dew point.

After its passage through the cooling zone, 20 to 90 volume percent is withdrawn from the primary flow and directed as the secondary flow to the evaporation zone. In the evaporation zone, the secondary air flow comes into contact with the heat transfer surface moistened by the aqueous salt solution. The moistening or wetting of the heat transfer surface is effected either by natural capillary wetting, or by employing forced wetting systems, such as by spraying or refluxing the aqueous salt solution.

In the evaporation zone, upon contact of the secondary air flow with the wetted heat transfer surface, heat- and mass-transfer occurs therebetween, said flow being moistened by the water caused to evaporate from the aqueous salt solution by virtue of the psychrometric temperature difference until the secondary air flow has a moisture content increased, as compared with the initial moisture content, by from 3.5 to 116 g/kg. Therewith, the latent heat of vaporization is expended by its extraction from the secondary air flow passing through the evaporation zone resulting in its cooling. Owing to the heat transfer taking place between the secondary air flow and the primary air flow, the latter is cooled, while moisture and heat are imparted to the former and in this state the secondary air flow is fed for condensing treatment.

It is therefore obvious, that in the course of the aforedescribed process, the heat of the primary air flow passing through the cooling zone is transferred via the heat transfer surface to the secondary flow passing through the evaporation zone by virtue of the water contained in the aqueous salt solution being caused to vaporize to thereby impart moisture to the secondary air flow. The cooling of the primary air flow at the outlet from the cooling zone is limited by a temperature which is close to the dew point of the outside air, and essentially below the wet-bulb temperature of said outside air.

If, presumably, the evaporation zone is fed with the outside air (not the secondary air as suggested by the herein proposed method) to be moistened by water evaporating from the aqueous salt solution by virtue of the psychrometric temperature difference, then the outside air and, consequently, the primary air flow could only be cooled to a temperature limited by the wet-bulb temperature of the outside air. However, because the evaporation zone is fed with the secondary air flow, as envisaged by the present invention, with the temperature thereof being essentially below that of the outside air, the process of imparting moisture to this secondary flow by the evaporation of the water contained in the aqueous salt solution by virtue of the psychrometric temperature difference, the lowest limit of a decrease in the temperature of the secondary air flow will be limited by the wet-bulb temperature of the secondary air flow entering the evaporation zone, this temperature being essentially lower than the wet-bulb temperature of the outside air. Accordingly, the primary air flow will also lose temperature to the same value due to the heat transfer between the flows. As a consequence, the temperature of the secondary air flow withdrawn from the primary flow and fed to the evaporation zone will be lower than the temperature thereof when withdrawn from the primary flow. In the evaporation zone, the temperature of the cooler secondary flow will be reduced further by the water evaporating from the aqueous salt solution to the wet-bulb temperature, which is lower than the preceding wet-bulb temperature and so on with the cycle repeating continuously. The lowest attainable temperature of the secondary air flow in the evaporation zone is a temperature which is essentially close to the dew point of the outside air. Due to the heat transfer between the secondary air flow passing through the evaporation zone and the primary air flow passing through the cooling zone, the primary air is cooled to a temperature close to the dew point, whereas the secondary air flow is heated by the same value.

Therefore, by imparting moisture to the secondary flow and by the heat transfer between the primary and secondary air flows in the cooling and evaporation zones two interrelated processes indispensible for water desalination are materialized, the processes being (1) moistening the secondary air flow with water vapor; and (2) cooling the primary air flow.

The moistened secondary flow and the remaining portion (80 to 10 vol percent) of the cooled primary flow are conveyed for condensation. As a result of heat transfer between these two flows (the temperature of the cooled primary air flow being below that of the dew point of the moistened secondary flow) water vapor is condensed in the condensing zone or desalinated water is thus obtained.

Preheating the primary air flow to a temperature of between 40° to 100° C. before delivery thereof to the cooling zone ensures a higher efficiency of vaporizing the water from the aqueous salt solution.

Preferably, the preheating is effected by the employment of easily available and inexpensive low-calorie heat energy, such as radiant energy or energy resulting from various technological processes. This low-calorie energy can not be used for the purposes of production based on the consumption of the high-calorie heat energy, such as for desalinating water according to the known method for evaporating water from the aqueous salt solutions.

In addition, the method according to the invention envisages the condensation of water vapor contained in the secondary air flow and spraying the primary air flow (that is 80 to 10 vol. percent of said flow which remains after the withdrawal of 20 to 90 vol. percent as the secondary flow) with the aqueous salt solution in the course of condensation. This technique materially improves the efficiency of the condensation process.

Preferably, preheating the primary air flow prior to its delivery to the cooling zone is conducted in combination with spraying the primary air flow (viz. the aforementioned portion thereof) in the course of condensation.

The invention will now be described in greater detail with reference to specific embodiments thereof taken in conjunction with the accompanying drawings, in which.

Figure 1:
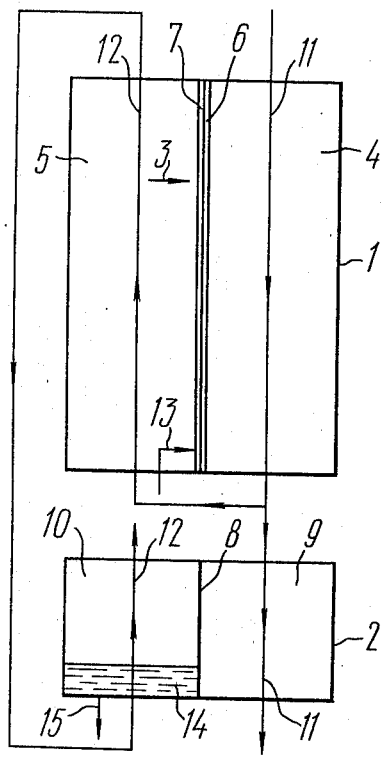
FIG. 1 is a view of a desalination unit according to the invention.

With reference to FIG. 1, an apparatus for desalinating water comprises vessel 1 and condenser 2. The vessel 1 is separated by a plate 3 into two zones: cooling zone 4 and evaporation zone 5. The plate 3 is made up of two layers: moisture-proof layer 6 and capillary porous layer 7, the moisture-proof layer 6 of the plate 3 being disposed in the cooling zone 4, while the capillary porous layer 7 is disposed in the evaporation zone 5.

Separating the condenser 2 into two zones, viz. cooling zone 9 and condensing zone 10, is a partition 8 fabricated from any suitable heat conducting material, such as aluminum foil.

Employed as the material for the moisture-proof layer 6 of the plate 3 are various materials impermeable to moisture, such as polythene film, aluminium foil, moisture repellent lacquers and paints, etc.

Various types of capillary porous plastics, highly porous paper and the like may be used as the material for the capillary porous layer 7 of the plate 3.

The moisture impermeable and capillary porous layers 6 and 7, respectively, are joined together such as by gluing, or by depositing a film of metal onto the plastic, or alternatively, by making use of the cohesive molecular forces; application of lacquers and paints onto the surface of the capillary porous materials may also be utilized for the same purpose.

The plate 3 can be of unitized one-material construction, such as of moisture impermeable aluminium foil one side of which is made capillary porous during its manufacture. Alternatively, it can be fabricated from a capillary porous plastic, one side of such plastic plate being subjected to thermal treatment tending to sinter the plastic and thereby close the pores, which makes the thus treated side of the capillary porous plastic impermeable to moisture.

For carrying out the herein proposed method of desalinating water with the apparatus shown in FIG. 1, a primary air flow 11 (outside air) is supplied to the cooling zone 4 wherein it is made to come into intimate contact with the moisture-impermeable layer 6 of the plate 3, which results in the primary air flow 11 thus being cooled. At the outlet from the cooling zone 4 a portion (between 20 and 80 vol. percent) of the primary air flow 11 is withdrawn to be fed as the secondary air flow 12 into the evaporation zone 5 of the vessel 1. The remaining portion (80 to 10 vol. percent) of the primary air flow 11 is delivered to the cooling zone 9 of the condenser 2.

In the evaporation zone 5 of the vessel 1 essentially between the secondary air flow 12 and the capillary porous layer 7 of the plate 3 wetted by the aqueous salt solution, a direct contact heat- and mass-transfer occurs. The capillary porous layer 7 is wetted either naturally or using a forced wetting systems, such as reflux systems of spraying the aqueous salt solution. The aqueous salt solution is delivered to the evaporation zone of the vessel 1 along a conduit 13, as seen best in FIG. 1.

While passing through the evaporation zone 5 of the vessel 1, the secondary air flow 12 is dampened by water evaporating from the aqueous salt solution by virtue of the psychrometric temperature difference, whereby the moisture content in said secondary flow 12 is raised relative to the initial moisture content by a range of between 3.5 and 116 g/kg. In addition, the secondary air flow 12 is heated in the evaporation zone 5 by virtue of the heat being transferred from the primary air flow 11 passing through the cooling zone 4.

After passing the evaporation zone 5 (i.e., after having been dampened and heated) the secondary air flow 12 is directed to the condensing zone 10 of the condenser 2. The moisture contained in the secondary air flow 12 is caused to condense in said zone 10 resulting in desalinated water 14. This is made possible due to the transfer of heat from the portion (80 to 10 vol. percent) of the primary air flow 11 passing through the cooling zone 9 of the condenser 2 to the secondary air flow 12. This desalinated water is discharged from the condensing zone 10 and directed via a condiut 15 for comsumption.

Having passed the cooling zone 9 and condensing zone 10 of the condenser 2, both the primary and secondary flows escape into the atmosphere.

In order to impart more intensity to the desalination process, the vessel 1 preferably accommodates a plurality of plates 3 adapted to separate the vessel 1 into a plurality of the cooling zones 4 and evaporation zones 5, the cooling zones being confined by the moisture-impermeable layers 6 of the plates 3, while the evaporation zones 5 are confined by the capillary porous layers 7 of the plates 3.

Advantages of the apparatus for desalinating water as represented in FIG. 1 include the structural simplicity and ease with which the process of water desalination can be carried out.

Figure 2:
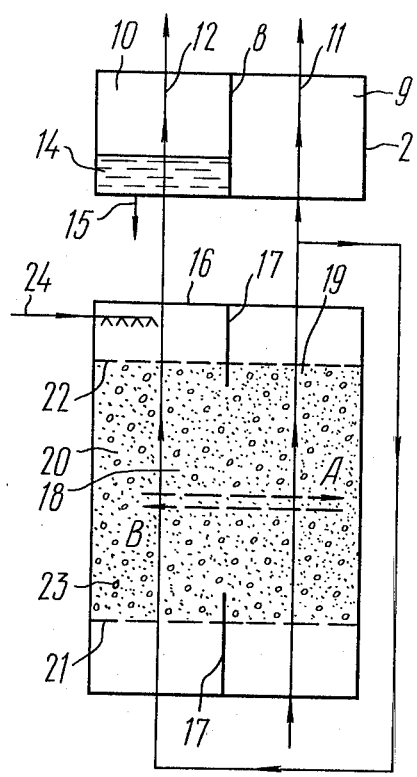
FIG. 2 is a side view of another modification of the desalination unit according to the invention.

Referring now to FIG. 2, there is shown a desalination unit comprised of a vessel 16 and a condenser 2. A partition wall 17 provided with an aperture 18 separates the vessel 16 into a cooling zone 19 and an evaporation zone 20. The aperture 18 is confined in the lower and upper portions thereof by air distribution lattices 21 and 22, respectively. The lattices are arranged substantially horizontally to extend through the cooling and evaporation zones 19 and 20. Filling in both the cooling and evaporation zones 19 and 20 to rest on the air distributed lattice 21 is a bed of loose particles 23. Various dispersable water-repellent materials of high thermal capacity, such as steel or glass pellets, gravel, crushed stone and the like, can be used as the particulate material.

In order to effect the herein proposed method of desalination in the apparatus shown in FIG. 2, the primary air flow 11 (outside air) is delivered to the cooling zone 19 of the vessel 16. After passing through the air distribution lattice 21, the primary air flow 11 is made to come into intimate contact with the bed of loose particles 23 in the cooling zone 19. Therewith, the bed of loose particles becomes fluidized, the movement of the bed, being confined by the air distribution lattices 21 and 22. The primary air flow 11 is thereby cooled as a result of contact with the fluidized bed in the cooling zone 19.

After the passage of the primary air flow 11 through the air distribution lattice 22 at the outlet from the cooling zone 19, some 20 to 90 vol. percent of the primary air flow 11 is withdrawn to be directed as the secondary flow 12 again via the air distribution lattice 21 into the evaporation zone 20, the remaining portion (80 to 10 vol. percent) of the primary air flow 11 being delivered to the cooling zone 9 of the condenser 2.

Upon the contact of the secondary air flow 12 with the bed of loose particles 23 in the evaporation zone 20 of the vessel 16, the bed becomes fluidized. The thus fluidized bed is sprayed with the aqueous solution of salt supplied along a conduit 24 which is accompanied by a direct contact heat- and mass-transfer between the secondary air flow 12 and the loose particles 23 of the fluidized bed. By virtue of the psychrometric temperature difference, the water of the aqueous salt solution used for spraying the loose particles of the bed is caused to evaporate into the secondary air flow 12 thereby imparting moisture thereto. the particles 23 are cooled down to the wet-bulb temperature of the secondary air flow 12 entering the evaporation zone 20.

The thus cooled particles 23 of the fluidized bed are displaced, such as by any known suitable conveyer means (not shown), from the evaporation zone 20 towards the cooling zone 19 (the path of displacement is generally indicated by the arrow A).

In the cooling zone 19, the direct contact heat transfer between the cooled particles 23 of the fluidized bed and the primary air flow 11 results in the latter also being cooled, whereafter a portion (20 to 90 vol. percent) of the flow 11 is withdrawn and used as the secondary flow 12, the remainder (80 to 10 vol. percent) being delivered to the cooling zone 9 of the condenser 2.

The particles 23 of the fluidized bed heated to the temperature of the primary air flow 11 entering the cooling zone 19 are then displaced, such as by means of any suitable conveyer means (not shown), from the cooling zone 19 towards the evaporation zone 20 (the path of displacement is generally indicated by the arrow B). In the evaporation zone 20, the secondary air flow 12 is heated due to contact with the heated particles 23 of the fluidized bed and further moistened due to the particles 23 of the fluidized bed being sprayed with the aqueous salt solution, whereafter the secondary air flow 12 is delivered to the condensation zone of the condenser 2.

Interaction of the flows (the secondary and a portion of the primary flow) in the condenser 2 and the way the desalinated water is discharged from the condenser and delivered for consumption are similar to the abovedescribed operation of the modified form of the apparatus with reference to FIG. 1.

It must be noted that the relationship between the amount of the secondary air flow 12 and the aqueous salt solution to spray the particles 23 of the fluidized bed within the evaporation zone 20 is chosen so as to permit complete evaporation of the aqueous salt solution in the evaporation zone 20 into the secondary air flow 12. This results in the particles 23 of the fluidized bed being cooled and dried before being displaced from the evaporation zone 20 towards the cooling zone 19, this being in turn necessary for efficient cooling of the primary flow 11 in the cooling zone 19 (within the temperature range close to the dew point) and consequently for efficiently carrying out the herein proposed method of desalination.

The processes of heat- and mass-transfer in the desalination apparatus shown in FIG. 2 are characterized by a very high intensity which is advantageous for successfully carrying out the desalination method. Also, the total heat transfer surface defined by the loose particles 23 of the fluidized bed is sufficiently large, thereby enabling to materially reducing the overall size of the desalination apparatus as compared with the modification represented in FIG. 1.

The advantages of the present invention will become more fully apparent from specific examples of the method of desalination according to the invention. In all the examples the power consumption is expressed as specific expenditure of electric power (in watts per 1 kg of desalinated water) required for imparting rotation to the electric drive of a fan used to convey the air flows; in a number of examples it is expressed as low-calorie heat energy (in watts per 1 kg of desalinated water) required for preheating the primary air flow prior to its supply to the cooling zone. No energy is consumed for the evaporation of water from the aqueous salt solutions in the evaporation zone. The energy consumed for imparting rotation to the electric drive of a pump used for the delivery of the aqueous salt solution to the cooling zone of the condenser 2 is negligible and therefore will not be taken into consideration. As to desalination of water according to the prior art method described heretofore, the amount of electric power consumed for driving the fan is essentially equal to that consumed for carrying out the method according to the present invention, whereas the amount of high-calorie energy consumed for the evaporation of water from the aqueous salt solutions approximates 600 kcal/kg under atmospheric pressure, which corresponds to about 695 watts per 1 kg of desalinated water.

EXAMPLE 1

Water desalination was carried out using the desalination unit shown in FIG. 1, wherein the moisture-impermeable layer 6 of the plate 3 was fabricated from moisture-impermeable aluminum foil, the capillary porous layer 7 of the plate 3 being made from polyvinyl chloride plastic (obtained from unplasticized polyvinyl chloride).

Supplied to the cooling zone 4 of the vessel 1 was the primary air flow 11 (outside air) having the following parameters: temperature $+40°$ C.; moisture content 5 g/kg.

After the primary air flow 11 had passed through the cooling zone 4, a portion (55 vol. percent) of the flow with a temperature of $+8°$ C. was withdrawn and directed as the secondary flow 12 to the evaporation zone 5 of the vessel 1. Delivered to this zone through the conduit 13 was an aqueous salt solution with a salt concentration of 17.5 g/kg. Said solution was made to dampen the capillary porous layer 7 of the plate 3. Upon contact of the secondary air flow 12 with the dampened capillary porous layer 7, water was caused to evaporate from the aqueous salt solution by virtue of the psychrometric temperature difference accompanied by dampening the secondary flow 12. At the outlet from the evaporation zone 5, the moisture content of the secondary flow 12 was increased by 14.7 g/kg relative to the initial moisture content.

After passing the evaporation zone 5, the secondary air flow 12 was directed to the condensing zone 10 of the condenser 2. Delivered to the cooling zone 9 of the same condenser was the remainder (45 vol. percent) of the primary air flow 11. Condensation of water vapor released from the secondary flow 12 occurred in the condensing zone 10; i.e. desalinated water 14 was obtained and discharged via the conduit 15 to the user.

The technical and economic figures of the desalination process were:
Specific consumption of the primary air flow 11, in $m^3$ per 1 kg of desalinated water ... 390
Specific consumption of electric power to impart rotation to the fan drive, in watts per 1 kg of desalinated water ... 11.7
Total specific heat transfer surface defined by the plate 3 of the vessel 1 and the partition 8 of the condenser 2, in $m^2$ per 1 kg of desalinated water .. . 10.7

EXAMPLE 2

Water desalination was performed essentially similarly to the process described in Example 1 except that the primary air flow 11 was heated to 100° C. making use of low-calorie energy prior to its delivery to the cooling zone 4 of the vessel 1. Therewith, the temperature of the primary flow 11 at the outlet from the cooling zone 4 amounted to $+13.5°$ C. The increase in the moisture content of the secondary air flow 12, relative to the initial moisture content, after the flow had passed the evaporation zone 5 of the vessel 1 was 46 g/kg.

The technical and economic figures of the desalination process were:
Specific consumption of the primary air flow 11, in $m^3$ per 1 kg of desalinated water ... 176
Specific consumption of electric power to impart rotation to the fan drive, in watts per 1 kg of desalinated water ... 3.5
Specific consumption of the low-calorie heat energy for heating the primary air flow 11, in watts per 1 kg of desalinated water ... 3000
Total specific heat transfer surface defined by the plate 3 of the vessel 1 and the partition 8 of the condenser 2, in $m^2$ per 1 kg of desalinated water .. . 3.1

EXAMPLE 3

Water desalination was carried out according to the operations described in Example 2, the difference being that a portion (45 vol. percent) of the primary air flow 11 directed to the cooling zone 9 of the condenser 2 was sprayed with the aqueous salt solution with a salt concentration therein of 17.5 g/kg.

The technical and economic figures of the desalination process were:
Specific consumption of the primary air flow 11, $m^3$/kg ... 97
Specific consumption of electric power to impart rotation to the fan drive, in watts per 1 kg of desalinated water ... 1.9
Specific consumption of the low-calorie heat energy for heating the primary air flow 11, in watts/kg .. . 1700
Total specific heat transfer surface defined by the plate 3 of the vessl 1 and the partition 8 of the condenser 2, in $m^2$/kg ... 1.4

EXAMPLE 4

Water desalination was carried out essentially according to Example 1 except that moisture content of the primary air flow was 25 g/kg. The temperature of the primary flow 11 at the outlet from the cooling zone 4 amounted to $+30.8°$ C. The percentage of the secondary air flow 12 delivered to the evaporation zone 5 was 22 volume percent of the primary air flow 11 which had passed through the cooling zone 4. The remaining 78 volume percent of the primary air flow 11 which directed to the cooling zone 9 of the condenser 2. An increase in the moisture content of the secondary air flow 12, relative to the initial moisture content, after the flow 12 had passed the evaporation zone 5 amounted to 14.7 g/kg.

The technical and economic figures of the process were:
- Specific consumption of the primary air flow 11, in m³/kg ... 540
- Specific consumption of electric power to impart rotation to the fan drive, in watts/kg ... 14.1
- Total specific heat transfer surface defined by the plate 3 of the vessel 1 and the partition 8 of the condenser 2, in m²/kg ... 12.8

EXAMPLE 5

Water desalination was performed essentially as described in Example 1 except that used as the plate 3 was a moisture-impermeable aluminum foil plate one side of which had capillary porosity imparted thereto in the course of its manufacture. The moisture-impermeable side of the plate 3 was arranged in the cooling zone 4 of the vessel 1. The other or capillary porous side thereof was positioned in the evaporation zone 5. Concentration of the aqueous salt solution amounted to 35 g/kg.

Supplied to the cooling zone 4 of the vessel 1 was the primary air flow 11 having the following parameters: temperature +40° C.; moisture content 30 g/kg. Temperature of the primary air flow 11 at the outlet from the cooling zone 4 was +33.3° C. The secondary air flow 12 delivered to the evaporation zone 5 was comprised of 22 volume percent of the primary air flow 11, which had passed through the cooling zone 4. An increase in the moisture content of the secondary air flow 12, relative to the initial moisture content, after the flow 12 had passed through the evaporation zone 5 was 12 g/kg.

The technical and economic figures of the process were:
- Specific consumption of the primary air flow 11, in m³/kg ... 590
- Specific consumption of electric power to impart rotation to the fan drive, in watts/kg ... 16.9
- Total specific heat transfer surface defined by the plate 3 of the vessel 1 and the partition 8 of the condenser 2, in m²/kg ... 14.6

EXAMPLE 6

Desalination was carried out essentially as described in Example 5 except the primary air flow 11 prior to it being supplied to the cooling zone 4 of the vessel 1 was heated to a temperature of +70° C. by the employment of low calorie heat energy. The moisture content of the primary air flow 11 was 25 g/kg and its temperature at the outlet from the cooling zone 4 was +32° C. An increase in the moisture content of the secondary air flow 12, as compared with the initial moisture content, after said flow had passed through the evaporation zone 5 was equal to 54 g/kg.

The technical and economic figures of the process were:
- Specific consumption of the primary air flow 11 in m³/kg ... 220
- Specific consumption of electric power to impart rotation to the fan drive, in watts/kg ... 5.3
- Specific consumption of low-calorie heat energy for heating the primary air flow 11, in watts/kg ... 2000
- Total specific heat transfer surface defined by the plate 3 of the vessel 1 and the partition 8 of the condenser 2, in m²/kg ... 4.8

EXAMPLE 7

Desalination was carried out essentially according to Example 5 except the primary air flow 11 was heated prior to being supplied to the cooling zone 4 of the vessel 1 to a temperature of +100° C. by the employment of low-calorie heat. Temperature of the primary flow 11 at the outlet from the cooling zone 4 was +38° C. An increase in the moisture content of the secondary air flow 12, as compared with the initial moisture content, after said flow had passed through the evaporation zone 5 was equal to 116 g/kg.

The technical and economic figures of the process were:
- Specific consumption of the primary air flow 11, in m³/kg ... 132
- Specific consumption of electric power to impart rotation to the fan drive, in watts/kg ... 3.1
- Specific consumption of low-calorie heat energy for heating the primary air flow, in wt/kg ... 2400
- Total specific heat transfer surface defined by the plate 3 of the vessel 1 and the partition 8 of the condenser 2, in m²/kg ... 2.8

EXAMPLE 8

Desalination was carried out essentially as described in Example 1, the difference being that use was made of the plate 3, the moisture-impermeable layer 6 which was fabricated from a moisture-impermeable lacquer, such as yellow naphthol, while the capillary porous layer 7 was made from polyvinyl chloride plastic.

The temperature of the primary air flow 11 at the outlet from the cooling zone 4 was +8° C. A portion (45% by volume) of the primary flow 11 directed to the cooling zone 9 of the condenser 2 was sprayed with an aqueous salt solution with a salt concentration therein amounting to 17.5 g/kg. Moisture content of the secondary air flow 12 relative to the initial moisture content was increased by 14.5 g/kg after said flow had passed the evaporation zone 5.

The technical and economic figures of the process were:
- Specific consumption of the primary air flow 11, in m³/kg ... 173
- Specific consumption of electric power to impart rotation to the fan drive, in watts/kg ... 9.8
- Total specific heat transfer surface defined by the plate 3 of the vessel 1 and the partition 8 of the condenser 2, in m³/kg ... 4.9

EXAMPLE 9

Desalination was carried out in the apparatus shown in FIG. 2. Steel balls or pellets of 6 mm in diameter were used as the particles 23 of the loose particle bed.

Supplied to the cooling zone 19 of the vessel 16 was the primary air flow 11 (outside air) with a temperature of +20° C. and a moisture content of 5 g/kg. After the passage through the cooling zone 19, a portion (90% by volume) of the primary air flow 11 with a temperature of +4° C. was withdrawn to be delivered as the secondary flow 12 to the evaporation zone 20 of the vessel 16. Conveyed along the conduit 24 to this zone was an aqueous salt solution having a salt concentration of 35 g/kg to be sprayed onto the bed of glass pellets 23, the bed becoming fluidized upon contact with the air. Direct contact heat- and mass-transfer occurred in the evaporation zone 20 between the secondary air flow 12 and the glass pellets 23 of the fluidized bed sprayed with the aqueous salt solution. By virtue of the psychrometric temperature difference, the water of the aqueous salt solution sprayed onto the glass pellets 23 was caused to evaporate into the secondary air flow 12 thereby increasing its moisture content. The moisture content of the secondary flow 12 at the outlet from the evaporation zone 20 was increased, as compared with the initial moisture content, by 3.5 g/kg.

Having passed the evaporation zone 20, the secondary air flow 12 was conveyed to the condensing zone 10 of the condenser 2. The rest of the primary air flow 11 (viz. 10% by volume) was also directed to the cooling zone 9 of the condenser, whereas in the condensing zone 10 condensation of the water vapor contained in the secondary air flow 12 occurred, that is the desalinated water 14 was obtained, the water being discharged and conveyed via the conduit 15 to the user.

The technical and economic figures of the process were:
- specific consumption of the primary air flow 11, in m³/per 1 kg of desalinated water . . . 4500
- Specific consumption of electric power to imart rotation to the fan drive, in watts per 1 kg of desalinated water . . . 87
- Total specific heat transfer surface defined by the glass pellets 23 and the partition 8 of the condenser 2, in m² per 1 kg of the desalinated water . . . 77

EXAMPLE 10

Desalination was carried out essentially similarly to Example 9 except the temperature of the primary air flow 11 (outside air) was not +20° C., but +40° C. Moisture content of the primary air flow was 5 g/kg.

Temperature of the primary air flow 11 at the outlet from the cooling zone 19 amounted to +12° C. A portion (40% by volume) of the primary air flow 11 which had passed through the cooling zone 19 was withdrawn and directed as the secondary flow 12 to the evaporation zone 20, whereinto there was also supplied the aqueous salt solution having a salt concentration of 35 g/kg. An increase in moisture content of the secondary flow 12 as compared with the initial moisture content after said flow had passed through the evaporation zone was equal to 18 g/kg.

Supplied to the cooling zone 9 of the condenser 2 was 60 volume percent of the primary air flow 11 which had gone through the cooling zone 19 of the vessel 16.

The major technical and economic ratings of the desalination process were:
- Specific consumption of the primary air flow 11, in m³/kg . . . 320
- Specific consumption of electric power to impart rotation to the fan drive, in watts/kg . . . 19.6
- Total specific heat transfer surface defined by the glass pellets 23 and the partition 8 of the condenser 2, in m²/kg . . . 3.6

EXAMPLE 11

Desalination was carried out essentially according to Example 9 except that prior to being supplied to the cooling zone the primary air flow 11 was heated to a temperature of +70° C. using a low-calorie heat energy. Therewith, temperature of the primary air flow 11 at the outlet from the cooling zone 19 was +15.5° C. The secondary flow 12 directed to the evaporation zone 20 amounted to 30 volume percent of the primary air flow 11 which had passed through cooling zone 19, the remaining 70 vol. percent of the primary flow 11 being conveyed to the cooling zone 9 of the condenser 2. Moisture content of the secondary flow 12 against the initial moisture content was increased, after said flow had passed through the evaporation zone 20, by 36 g/kg.

The technical and economic ratings of the process were:
- Specific consumption of the primary air flow 11, in m³/kg . . . 155
- Specific consumption of electric power to impart rotation to the fan drive, in watts/kg . . . 3.5
- Specific consumption of low-calory heat energy for heating the primary air flow 11, in watts/kg . . . 2500
- Total specific heat transfer surface defined by the glass pellets 23 and the partition 8 of the condenser 2, in m²/kg . . . 2.

INDUSTRIAL APPLICABILITY

The method according to the invention desalinates both sea water and saline continental waters. The thus desalinated water may find application either for public utilities or in the industry as process water.

We claim:

1. A method for desalinating water from an aqueous salt solution comprising
   (a) passing a primary air stream through a cooling zone of an evaporation unit;
   (b) withdrawing about 20 to 90 volume percent of the cooled primary air stream from the outlet of said evaporation unit cooling zone and passing it as a secondary air stream through an evaporation zone of said evaporation unit wherein said secondary air stream becomes humidified with moisture evaporating from an aqueous salt solution contained therein, said humidification being accomplished by virtue of the psychrometric temperature difference between the primary air stream and the secondary air stream as they pass in indirect heat exchange through the cooling zone and evaporation zone, respectively, thereby increasing the moisture content in the secondary air stream from about 3.5 to 116 g/kg;
   (c) passing the remaining 10 to 80 volume percent of the cooled primary air stream through a cooling zone of a condensing unit;
   (d) passing the humidified secondary air stream from the outlet of said evaporation zone to a condensing zone of the condensing unit wherein moisture is condensed therefrom in the form of desalinated water, as a result of indirect heat exchange between the secondary air stream in the condensing zone and the cooled primary air stream in the cooling zone.

2. The method of claim 1, wherein the primary air flow, prior to entering the cooling zone of the evaporation unit in step (a) is heated to a temperature of about 40 to 100° C.

3. The method of any of claims 1 or 2, wherein condensation of water vapor from the secondary air stream in step (d) is effected by contacting the primary air stream in the condensing zone of the condensing unit with the aqueous salt solution.

4. The method of claim 3, wherein said aqueous salt solution contacts the primary air stream in the form of a spray.

* * * * *